(12) United States Patent
Dulligan et al.

(10) Patent No.: US 7,770,380 B2
(45) Date of Patent: Aug. 10, 2010

(54) METHODS OF CONTROLLING SOLID PROPELLANT IGNITION, COMBUSTION, AND EXTINGUISHMENT

(76) Inventors: Michael Dulligan, 43424 16th West, Apt. 24, Lancaster, CA (US) 93534; James Lake, 649 Macedonia Dr., Punta Gorda, FL (US) 33950; Paul Adkison, 9310 Columbine Ave., California City, CA (US) 93505; Greg Spanjers, 20 Kiva Pl., Sandig Park, NM (US) 87047; David White, 4360 San Juan Ct., Rosamond, CA (US) 93560; Hieu Nguyen, 2727 Sandstone Ct., Palmdale, CA (US) 93551

( * ) Notice: Subject to any disclaimer, the term of this patent is extended or adjusted under 35 U.S.C. 154(b) by 2176 days.

(21) Appl. No.: 10/342,003

(22) Filed: Jan. 13, 2003

(65) Prior Publication Data

US 2008/0087003 A1    Apr. 17, 2008

Related U.S. Application Data

(60) Provisional application No. 60/349,074, filed on Jan. 16, 2002.

(51) Int. Cl.
*F02K 9/96* (2006.01)

(52) U.S. Cl. .......................................... 60/254; 60/234

(58) Field of Classification Search ................. 60/257, 60/233, 253, 242, 234, 250, 241, 240, 247, 60/254, 255, 256
See application file for complete search history.

(56) References Cited

U.S. PATENT DOCUMENTS

| | | | |
|---|---|---|---|
| 3,023,570 A | 3/1962 | Crouch |
| 3,989,191 A | 11/1976 | McCullough |
| 4,078,953 A | 3/1978 | Sayles |
| 4,357,795 A | 11/1982 | Bastian et al. |
| 4,397,149 A | 8/1983 | Kosaka et al. |
| 4,411,717 A | 10/1983 | Anderson |
| 4,550,888 A | 11/1985 | Douglass et al. |
| 4,756,251 A | 7/1988 | Hightower, Jr. et al. |
| 4,840,024 A | 6/1989 | McDonald |
| 4,952,341 A | 8/1990 | Sayles |
| 4,972,673 A | 11/1990 | Carrier et al. |
| 5,099,645 A | 3/1992 | Schuler et al. |
| 5,372,070 A | 12/1994 | Neidert et al. |
| 5,491,973 A | 2/1996 | Knapp et al. |
| 5,515,765 A | 5/1996 | Wilkinson |
| 5,533,331 A | 7/1996 | Campbell et al. |
| 5,675,966 A | 10/1997 | Dombrowski et al. |
| 5,715,675 A | 2/1998 | Smith et al. |
| 5,808,231 A | 9/1998 | Johnston et al. |
| 5,847,315 A | 12/1998 | Katzakian, Jr. et al. |
| 5,854,439 A | 12/1998 | Almström et al. |
| 6,086,692 A | 7/2000 | Hawkins et al. |
| 6,125,763 A | 10/2000 | Kline et al. |

*Primary Examiner*—Timothy D Collins
(74) *Attorney, Agent, or Firm*—Christie, Parker & Hale, LLP

(57) ABSTRACT

An apparatus and method to control ignition, combustion burn rate, extinguishment, and reignition of solid propellant is provided.

23 Claims, 6 Drawing Sheets

METHODS OF CONTROLLING SOLID PROPELLANT IGNITION, COMBUSTION, AND EXTINGUISHMENT

CROSS-REFERENCE TO RELATED APPLICATIONS

This application claims priority based on U.S. provisional application No. 60/349,074, filed Jan. 16, 2002, which is incorporated herein by reference.

STATEMENT REGARDING FEDERALLY SPONSORED RESEARCH

The U.S. Government has certain rights in this invention pursuant to contract numbers F04611-C-99-0020 and F04611-99-C-0003 awarded by the U.S. Department of the Air Force.

FIELD OF INVENTION

The invention relates to methods of electrically initiating, electrically controlling, and extinguishing the combustion and burn rate of energetic materials.

BACKGROUND OF INVENTION

The development of solid propellant thruster technology, both of propellant formulations and system configurations, largely concerns methods of burn rate control, and thus thrust control to satisfy mission design requirements. Key to successful thrust control is not only the ability to adjust the magnitude of thrust, but also the ability to completely extinguish the combustion process upon command and the facility to have subsequent reignition/extinguishment cycles, all on command. Ideally, such thrust control is achievable in real-time and not merely by a thrust profile engineered into the system at the time of manufacture. Although thrust control is readily achievable for liquid propulsion systems and hybrid propulsion systems, these systems are more expensive, more complex and less reliable than comparable solid propellant systems. In addition, the majority of thruster systems that utilize liquid propellants are highly toxic.

Consider, for example a dual thrust mode of operation. The boost/sustain thrust profile is designed to initially provide high thrust to accelerate the propelled object, followed by a reduced thrust mode of operation that merely sustains the propelled object's velocity, thereby enabling extended propellant burn times. The difficulties inherent to controlling conventional propellant burn rates and the state-of-the-art solutions are reviewed in U.S. Pat. No. 6,086,692, issued to Hawkins, et al. and is hereby incorporated by reference. One problem identified by Hawkins, et al. associated with conventional propellant formulations, is the inherent risk of catastrophic failure due to the potential for burn rate runaway. Burn rate runaway can occur because of the relationship between propellant burn rate and pressure. Typically, as pressure is increased, the burn rate increases causing an exponential increase in burn rate and again an increase in pressure, ultimately terminating in critical failure of the motor. Accordingly, controlling the pressure is critical and difficult for such thrusters. Hawkins, et al. propose using propellants whose burn rate is relatively insensitive to pressure offering greater reliability through consistent performance and ease of predictability. However, two significant barriers to total thrust control of solid propellant systems remain with this system: the inability to alter the thrust profile in real-time, and the inability to completely extinguish the propellant combustion followed by reignition upon demand.

Another means of controlling propellant burn rate, is the use of propellants whose burn rate may be tailored by the addition of varying amounts of a given chemical ingredient. This class of propellants can be used to tailor the thrust profile by varying, in accordance with the desired thrust profile, the density of the critical burn rate controlling ingredient throughout the propellant grain. Numerous specific examples of this design philosophy exist, as represented by the following two patents: U.S. Pat. No. 5,372,070 to Neidert, et al., and in U.S. Pat. No. 4,411,717 to Anderson. However, the method of burn rate control by variations in chemical composition throughout the grain also suffer the problems of extinguishability and thrust profile alteration in real-time.

Alternatively, systems have been designed to control propellant burn rates through mechanical means. For example, U.S. Pat. Nos. 4,952,341 to Sayles and 4,756,251 to Hightower, et al. Sayles discloses the method of embedding shrink tubes or spheres within the propellant for the purpose of enhancing propellant burn rate, and Hightower, et al. disclose a method of embedding within the propellant grain a series of reticulated structures such that the propellant burn rate is variable, and similarly the thrust profile may be shaped as desired. Again, though, the thrust profile of the thruster using such a system is fixed at the time of manufacture and there is no provision for a start/stop/restart capability.

Yet another common mechanical means of controlling the burn rate is to construct the grain of the propellant with deliberate variations in exposed propellant surface area and the intentional inclusion of void spaces of designed dimensions. For well characterized propellants, these methods are tolerable, but in addition to the aforementioned problems of extinguishment and the lack of real-time thrust profile adjustment, the efficiency of these motors is decreased due to the increased volume that follows from the requirement for void spaces to control pressure and thus burn rate.

To achieve total control of the thrust profile, not only must propellant burn rate be actively controlled, thrusters must also have the capability of many start/stop/restart cycles. The ability to stop and then restart liquid propellant and hybrid propellant thruster systems is well established; however, problems of high cost, propellant toxicity, system complexity, and reliability encourage the search for solid propellant thruster systems that are capable of multiple start/stop/restart cycles.

Two common methods of achieving multiple start/stop/restart cycles for solid propellant thruster systems are the inclusion of discrete segments of propellant charges separated by some form of frangible material with a separate ignition means for each segment, or a pressure release system designed to vent the chamber pressure rapidly enough that extinguishment occurs. For example, consider U.S. Pat. Nos. 4,972,673 to Carrier, et al., 5,675,966 to Dombrowski, et al., and 4,078,953 to Sayles in which dual stage solid propellant rocket motors that rely upon a physical barrier between two distinct propellant grain regions to be broken upon command are disclosed. Again, although each of these concepts addresses multi cycle operation, none offer complete control, as the segments are always of finite capacity thus preventing smooth variation in the thrust profile, and, as always, the potential for unintentional segment ignition is present.

A particularly innovative means of thrust control that also achieves the zero thrust, start/stop multicycle operation is delineated in McDonald, et al.'s disclosure, U.S. Pat. No. 4,840,024 in which a complex system of valves and ducting is employed to control thrust. However, a detrimental aspect of McDonald, et al.'s solution to the problem of thrust control and restartability is the extreme complexity of the valving apparatus and the significant mass penalty. In addition, the exhaust from a gas generator charge is routed to pass over the main propellant charge for ignition and the exhaust is routed out of the combustion chamber during the extinguishment procedure. Finally, another problem is that the gas generator propellant charge is never extinguished and has a limited lifetime.

Finally, the concept of utilizing electric power to ignite and control propellant burn rate has been previously discussed. Electric power provides one standard means of igniting typical rocket propellants, in that an element is ohmically heated to temperatures above that required for propellant ignition. A comprehensive review of the application of electric power to the problem of enhancing efficiency in gun ammunition is provided in U.S. Pat. No. 5,515,765 to Wilkinson. This patent discloses the concept of controlled ignition of propellants through the use of electrothermal chemical cartridges. However, this application of electrical power to energetic materials is limited to the control of burn rate only, combustion continues despite the removal of electric power.

A related patent, U.S. Pat. No. 5,854,439 to Almstrom, et al. also discloses a method for electrically initiating and controlling the burning of a propellant charge. The innovation in this case relates to the inclusion of multiple and separate electrically conductive surfaces within the propellant for the purpose of passing electric current through the conductive segment, causing electrothermal heating of the segment followed by ignition of the propellant within that segment. The concept capitalizes solely upon the ohmic heating of a conductor to initiate propellant combustion and is unsuited, as disclosed, to the application of thrusters because of the extreme requirement for electric power. More specifically, the patent states the electric power unit is estimated to weigh 100-300 kg per kg charge weight of the propellant, a ratio clearly unfavorable to rocketry.

The state-of-the-art in controllable energetic materials that are influenced by the application of electric power is disclosed in a provisional patent to Katzakian, et al. Prov. Application No. 60/287,799, filed on Apr. 30, 2001, the disclosure of which is incorporated herein by reference. The disclosed invention describes a class of solid propellants whose combustion mechanism depends on electric power such that application of electric power above some critical value results in propellant ignition with subsequent sustained combustion and application of electric power below some critical value results in a cessation of combustion; however, no discussion of how the combustion may be controlled by the application of electric power is given, nor is any mention made of the mechanism.

Accordingly, a need exists for a state-of-the-art propellant control that enables economic and simple thrust control.

SUMMARY OF INVENTION

The present invention is directed to apparatuses and methods to control solid propellant ignition and reignition by the means of application of electrical power.

In one embodiment of the invention solid propellant combustion and burn rate are controlled by the means of application of electrical power.

In another alternative embodiment of the invention solid propellant extinguishment is controlled by the means of removal of electrical power.

In still another embodiment of the invention total control over the propellant burn rate by the means of electric power control are provided.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
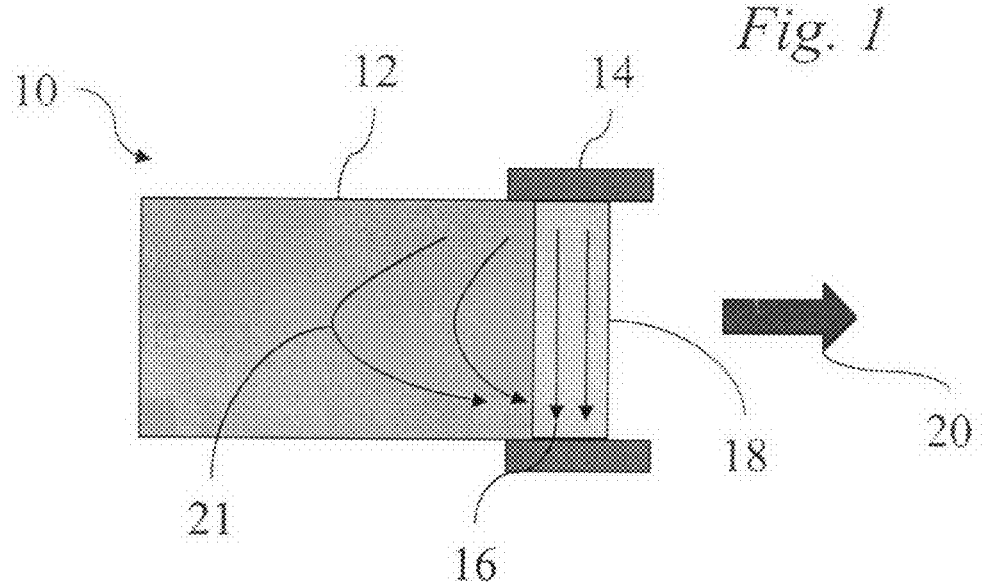
FIG. 1 schematically shows the general component arrangement of the propellant, electrodes, combustion volume, and exhaust direction for an exemplary embodiment of the invention.

The present invention is directed to apparatuses and methods to control solid propellant ignition and reignition by the means of application of electrical power. Specifically, the present invention is directed to the precision and controlled applications of electrical power to actively control propellant burn rate in propulsion systems. The methods of the disclosed invention offer increased reliability, decreased complexity, and faster response time. In addition, the methods of the disclosed invention enable real-time thrust profile programmability, and enable a means of commanding propellant extinguishment.

Each of the techniques disclosed herein relies on the use of a solid propellant whose combustion results from the application of electrical power.

Generally, a propellant comprises several components: (1) a fuel, the component which actually burns, such as, hydrogen, diesel fuel, and kerosene; (2) an oxidizer, the component which reacts with the fuel oxidatively, such as oxygen, ammonium nitrate (fertilizer), hydroxyl ammonium nitrate, nitrogen tetroxide, and hydrazine; and (3) a binder, the component which provides mechanical integrity to the fuel and oxidizer mix, such as polymers and sawdust.

For example, a pure fuel/oxidizer mix burned in rocket engines such as the space shuttle main engines is liquid hydrogen mixed with liquid oxygen (LOX). An example of a fuel that is easier to handle is kerosene, also mixed with LOX and burned in rocket engines. Hypergolic liquids are those that spontaneously exothermically react upon contact with each other. In contrast, solid propellants typically sit with fuel in contact with oxidizer but no reaction occurs until they are heated sufficiently to melt and then they mix as a liquid and then burn.

Examples of fuel/oxidizer/binder mixes include: nitroglycerine which is a large molecule that has an oxidizer part and a fuel part and decomposes explosively. Dynamite incorporates sawdust binder to stabilize the nitroglycerine.

Although explosives such as dynamite are closely related to propellants there are significant differences. Explosives have the energy stored in highly strained bonds (TNT for example) and they typically have oxidizer and fuel parts of the same molecule, requiring some kind of stimulus to ignite. Propellants typically have distinct and separate fuel and oxidizer components (though it is quite common to supplement the oxygen balance by utilizing fuels containing oxygen atoms) and the stimulus is to initiate the exothermic reaction of the fuel and oxidizer. The energy release is not just in the release of strained bonds, rather it is in the thermodynamics and energetics of the reaction.

The thrusters described in the present invention are directed to electrically controllable rocket motors based on a class of controllable propellants called electrically controlled extinguishable solid propellants (ECESPs). One exemplary material is disclosed in several patents and patent applications to Katzakian, et al., including: U.S. Pat. No. 5,847,315, issued on Dec. 8, 1998; U.S. application Ser. No. 10/136,786, filed Oct. 30, 2002; and U.S. Prov. App. No. 60/287,799, filed on Apr. 30, 2001 and Registration No. 39,209, filed Apr. 24, 2002, the disclosures of which are incorporated herein by reference.

Broadly speaking, the current invention requires a propellant containing: a fuel, an oxidizer, a binder, and a means of supporting high electrical conductivity (i.e., a low resistance propellant), which is stable until the application of a potential difference (voltage) occurs. As discussed above, suitable formulations are generically referred to in this disclosure ECESPs.

Application of electric power to these energetic materials causes ignition to occur in a fast, known, and reproducible time period yielding precision control of ignition to the user. Similarly, reignition will occur upon application of electric power in like fashion, with the assumption that initial temperature has been properly taken into consideration. In the following embodiments of the invention, ignition and reignition occur directly as a result of the application of some form of electric power, thus solving the problem of achieving combustion in a controlled fashion precisely on demand.

Accordingly, in the current invention ignition and reignition of the energetic material is caused by the application of electrical power. Several approaches can be used to apply this power including direct current, alternating current, transient pulses, pulse density modulation, and power profile shaping. Geometry can also be modified to provide for further control of the volume of propellant subjected to the electrical control. The physical characteristic of the ECESP materials to have decreased electrical resistivity with increased temperature, enables the use of programmed current profile shaping to further control the volume of propellant subjected to electrical control. Accordingly, the present invention is directed to the general use of electrical control circuits to control the combustion of ECESP propellants.

Turning now to the design of the thruster, any suitable thruster design may be used such that an electrical control current can be controllably applied to the propellant. One exemplary thruster embodiment 10 is shown in FIG. 1 and comprises generally: a volume of propellant 12 disposed in electrical communication with at least one electrode 14 designed to apply an electrical current 16 through the propellant. In the thruster systems of the current invention, such as the one depicted schematically in FIG. 1, it is preferred to apply electrical current only to the volume of propellant for which combustion is desired to minimize the applied power needed to support the combustion process and, as a result, maximize energy efficiency. Typically, as shown in FIG. 1, this combustion volume 18 is a small layer at the face of the propellant 12 so that combustion occurs only near the face, and the exothermic energy can then expand the exhaust 20 away from the propellant to create thrust. Any current 21 that is allowed to flow deep within the propellant may serve to preheat propellant in an advantageous fashion, but is in general an inefficient use of available energy.

Accordingly, control of the thrust is generally maintained by controlling one or both of the propellant geometry and the form and nature of the electrical current applied to the propellant. Embodiments using both criteria are described below.

Effect of Geometry on Combustion

Two general classes of thruster geometry are disclosed for the application of electricity to ECESPs: Coaxial and Rectangular. In either case the electrodes can be very short in axial length, so as to contact the propellant only at the front face, or be long in extent to create an extended region of contact with the ECESP.

Regardless of the actual electrode design, the electrodes should be spaced in relation to the propellant and each other such that a relatively constant level of power per unit area is applied across the thruster face.

Figure 2A:
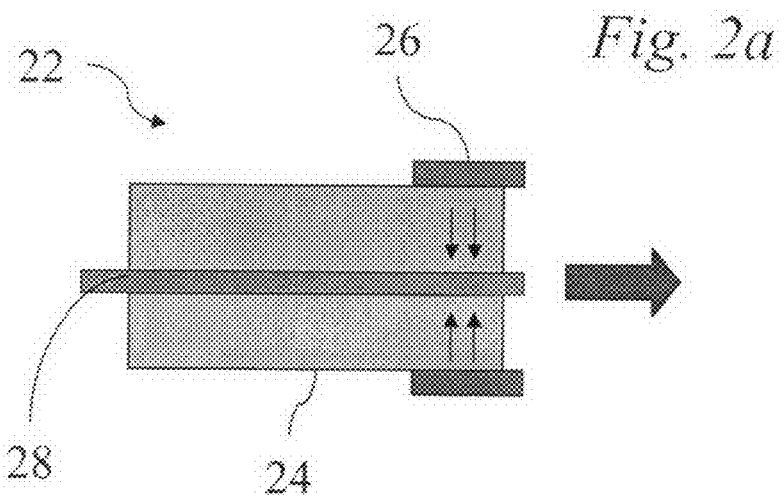
FIGS. 2a and 2b schematically show an exemplary embodiment of the invention having a coaxial configuration.
Figure 2B:
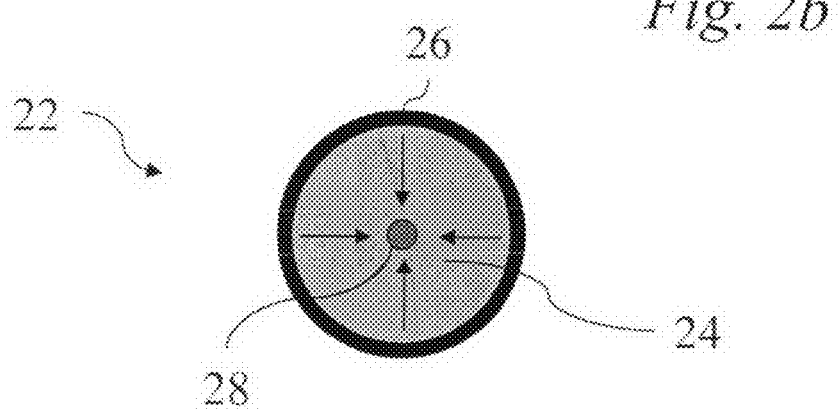

In the coaxial configuration 22, shown in FIGS. 2a and 2b, the ECESP 24 is placed between two circular coaxial electrodes 26 and 28 similar in design to a coaxial cable where the insulator is replaced with an ECESP material. In such an embodiment, electrical current is passed through the ECESP, between the inner and outer conductor, to ignite the propellant. FIG. 2a shows a coaxial configuration with an axially long center electrode 28, with an extended region of contact with the propellant, and a short outer electrode 26. All combinations of short and long electrodes for both rectangular and coaxial geometries are claimed within this disclosure.

Figure 3A:
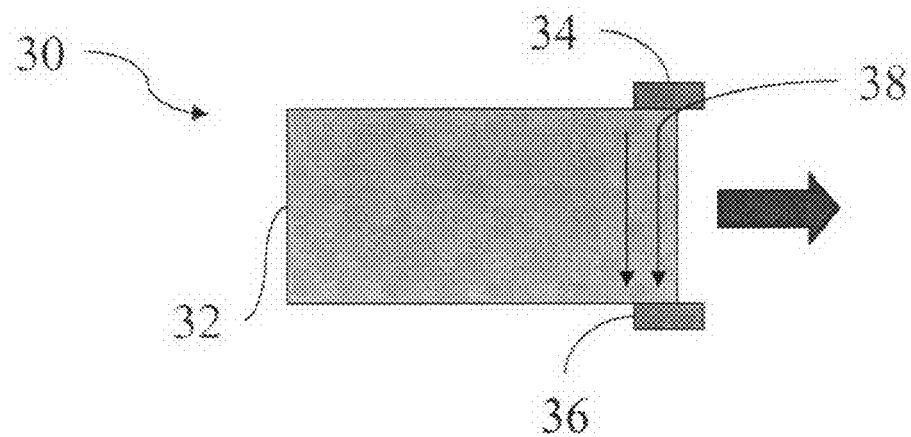
FIGS. 3a and 3b schematically show an exemplary embodiment of the invention having a rectangular configuration.
Figure 3B:
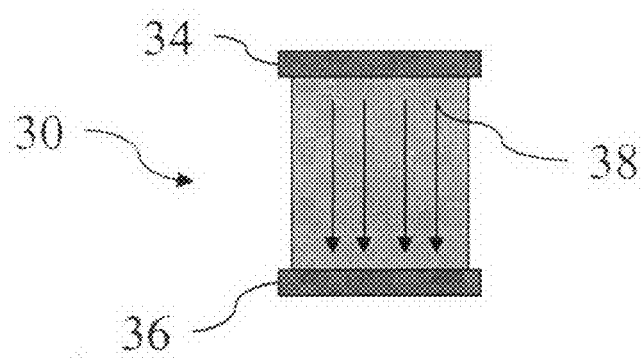

In the rectangular configuration 30, shown in FIGS. 3a and 3b, the ECESP 32 is placed between two external rectangular electrodes 34 and 36. Current 38 is applied so as to conduct near the face of the propellant between the electrodes.

An advantage of the coaxial configuration is packaging, however, the design is problematic for the application of electrical power, because local current density is much higher near the inner electrode. In such an embodiment, if the combustion mechanism is dependent on current density this will result in preferential combustion near the center electrode until a deep conical shape is recessed into the propellant near the inner electrode. Such a burning pattern has been observed in laboratory tests and leads to motor failure due to a loss of electrical contact with the inner electrode prior to complete combustion of the available propellant.

A solution to the problem of the coaxial burning pattern, claimed herein, is to modify the propellant to be more electrically resistive at larger radii and less resistive at smaller radii. As an example, for a fixed applied current, I, the current density distribution across the radial face of the coaxial propellant can be described by the equation:

$$J(r) = \frac{I}{2\pi\delta r} \quad (1)$$

where r is the radial distance from the center of the inner electrode and δ is the axial thickness of the current penetration. In this case total ohmic heating power into the propellant is described by the equation:

$$P_{Total} = I^2 R \quad (2)$$

where R is electrical resistance. However, local power deposition across the coaxial face is given according to the equation:

$$P(r) = J^2 R = \frac{I^2 R}{(2\pi\delta)^2 r^2} \quad (3)$$

Thus, power deposition strongly increases with smaller radii leading to the observed conical propellant burns in laboratory tests. One possible solution is to modify the propellant during formulation so that it has a resistance that decreases at smaller radii proportional to the square of the radius, according to:

$$R(r) = Cr^2 \quad (4)$$

where C is a constant. Then the local power deposition can be described as:

$$P(r) = \frac{I^2 C}{(2\pi\delta)^2}. \quad (5)$$

This is independent of radius indicating that the ohmic power deposition will be uniform across the propellant face, leading to a uniform combustion and burn profile. In such embodiments a thruster is formed having a ECESP propellant with spatially varying electrical properties. Accordingly, this invention is also directed to methods of spatially varying the ECESP electrical characteristics so as to create a more advantageous propellant heating and combustion distribution.

For example, in one embodiment the dielectric constant of the ECESP material is spatially tailored to adjust the local electric field. Such an approach would be advantageous in the scenario where electrolysis strongly affects the combustion rate. Alternatively, spatial variations in the ECESP magnetic permeability can be utilized in thruster systems where the propellant is controlled using a high-frequency alternating current, or transient pulses of current.

Alternating Current VS Direct Current VS Transient Pulses

Although the above discussion has focussed only on geometric effects, the thrust of a thruster can also be partially or wholly controlled by varying the type and strength of the electrical input.

For example, previous disclosures have considered only the use of 400V, 60 Hz AC voltage to demonstrate the ignition and extinguishments of a specific ECESP formulation in a coaxial geometry. Applicants have discovered that more thrust control can be obtained by varying the nature of the applied voltage, e.g., by using DC voltage or AC voltage over a larger range of frequencies, or by using transient pulses of current.

In one embodiment, the inventive system uses Direct Current (DC). The advantage of DC over Alternating Current (AC) is primarily in the simplification of the power processing needed to energize a motor using ECESP as a propellant. For example, in a spacecraft application, 28V-300V DC is readily available from solar arrays without processing. For missile and rocket applications, battery power would likely be used to supply a DC voltage.

However, despite this simplification, higher voltage requirements would require power processing to step up the voltage. Because the amplification of DC voltage requires the conversion to AC and back to DC, it may be advantageous to operate many ECESP motors using AC. For terrestrial applications of ECESP motors, each operating mode is likely to be advantageous in varied application regimes.

A critical difference in the power application for the AC and DC cases is in how the current distributes itself within the propellant. For low frequency current, including DC as the limiting case, current will distribute itself along paths of least electrical resistance. In contrast, in embodiments using high frequencies, electromagnetic effects dominate the current penetration into the material. For example, in a good conductor the distance it takes for the current to decrease by 67% is called the skin-depth and can be approximated according to the equation:

$$\delta = \left(\frac{2\rho}{\mu\omega}\right)^{1/2} \quad (6)$$

where $\rho$ is the specific resistivity of the material, $\mu$ is the magnetic permeability, and $\omega$ is the frequency of the applied current.

For an embodiment using a transient pulse of current, the electromagnetic wave will begin to penetrate the material while currents in the material compete to exclude the magnetic field penetration. If the transient pulse were allowed to continue for several cycles of AC current, the two effects would balance out with a current penetration depth equal to the skin depth. However, in the scenario where the propellant is energized with a single (or a few) transient pulses, the fields have insufficient time to fully penetrate to the skin depth. In this transient pulse case, the energy deposition can be restricted to a combustion volume much smaller than that available for a continuously applied AC current. Accordingly, each of these methods of applying electrical current to the ECESP can be used to advantage in various operating scenarios.

For the DC and low frequency AC cases, and for the case where the propellant has spatial uniform resistivity, a majority of the current will flow directly between the electrodes because it represents the shortest physical path. Only a small amount of stray current will flow well behind the combustion volume, as illustrated in the current paths of FIG. 1. This stray current can represent an energy loss because it is not directly fueling the combustion volume. However, the stray current will also serve to preheat propellant so for short duration missions (<1 minute) the heating energy may eventually be recovered. For longer duration missions though, thermal conduction will eventually transmit the heat energy away from the ECESP resulting in a net energy loss to the system.

Figure 4:
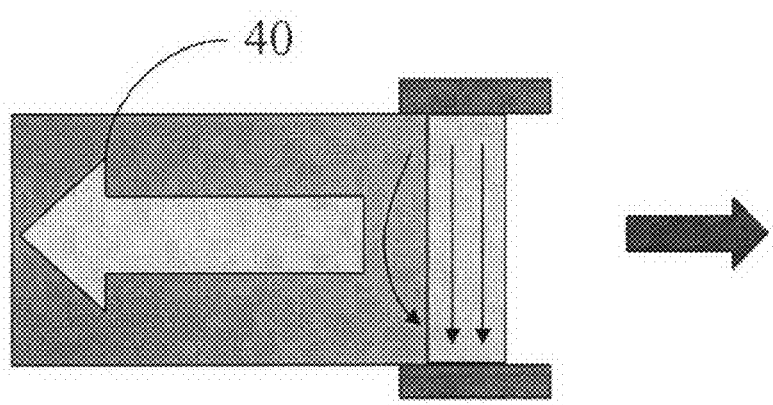
FIG. 4 schematically shows an exemplary embodiment of the invention having an increased resistance configuration.
Figure 5:
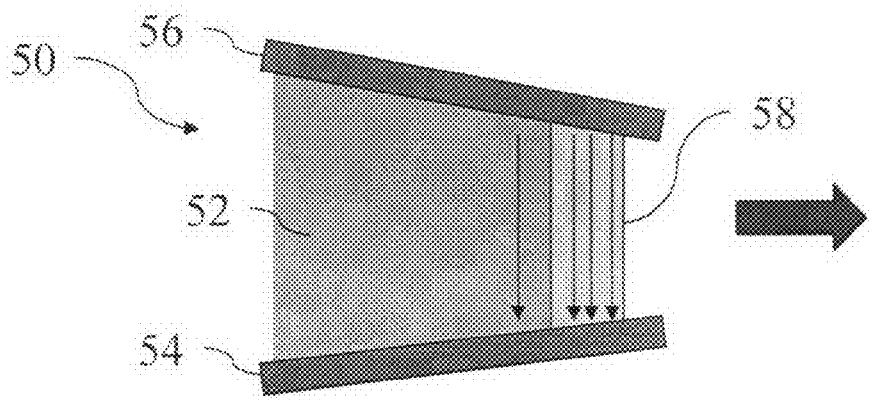
FIG. 5 schematically shows an exemplary embodiment of the invention having a canted configuration.

Although such energy losses can be a problem, in a preferred embodiment, modifications to the propellant and electrode design can be used to better restrict applied current to the combustion volume. For cases where modifications to the electrical characteristics of the propellant are considered, the current will follow the path that minimizes the product of resistance and distance. The ECESP propellant formulation can be tailored to be less resistive near the propellant face and increasingly more resistive in the axial direction, as indicated by arrow 40 in FIG. 4. Alternatively, for a thruster 50 having long electrodes with an extended region of contact with the propellant 52, canting of the electrodes 54 and 56 can be used to keep the shortest conduction path within the combustion volume 58, as shown in FIG. 5. Although FIGS. 4 and 5 show an embodiment having a rectangular geometry, the approaches are equally applicable to the coaxial geometry.

Figure 6A:
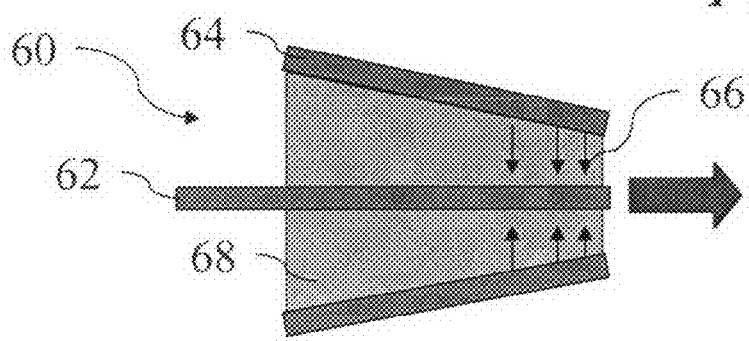
FIGS. 6a and 6b schematically show exemplary embodiments of the invention having two canting configurations.
Figure 6B:
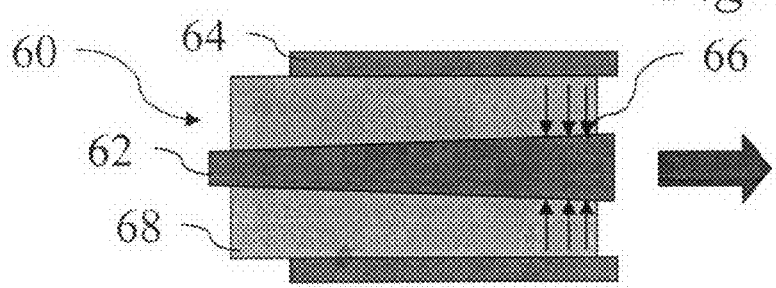

Exemplary embodiments of a thruster coaxial system 60 are shown in FIGS. 6a and 6b, where the coaxial electrodes 62 and 64 are canted to minimize the resistive path length in the combustion volume 66 at the face of the propellant 68. Although these figures show independent canting of the inner 62 and outer 64 electrodes, any combination of canting one or both electrodes of either linear or compound curve design may be used. Also either canting configuration may be used in combination with an ECESP formulated with spatial variations in the electrical properties.

In another embodiment, high-frequency AC current can be used as a means of confining the applied electrical power to a desired combustion region at the propellant face. Although ideally the current penetration can be described in terms of a skin depth, in practice, depending on the regime of propellant resistivity and AC frequency, DC effects can still have a role. Thus canted electrodes, propellant formulated with spatially varying electrical properties (including resistivity, magnetic permeability, and dielectric constant), and high-frequency AC current may be used in any combination or subset.

In addition, the applied high-frequency AC current is not limited to currents applied on a continuous basis. The electromagnetic characteristic, of varying currents to be restricted to a limited penetration in conductive material, is enhanced when the AC current is applied for short durations. Accordingly, the use of a burst, pulse, or transient of current, such as from a capacitive discharge, alone or in combination with electrode canting and tailored propellant formulations may also be used.

Runaway Heating to Restrict Current Volume

The ECESP formulation has the characteristic of decreasing resistivity with temperature, which is not typical of a normal solid. This enables the preferential heating of a surface layer within the combustion volume through a technique, referred to herein as "runaway heating." In this technique low power current is initially applied to the propellant in a configuration selected to preferentially heat the combustion volume at the propellant face. As a result of this current the temperature increases in this region, which in turn decreases the resistance. As more current is applied a greater fraction will flow in the desired combustion volume, because the temperature gradient created by the previous current has also established a shorter resistive path in this region. The added current has the effect of further increasing the temperature in the combustion volume, which further decreases the local resistance. Eventually, through judicious programming of the input current, a highly conductive path can be created at the propellant face using low power. Once this highly conductive path is established, comparatively higher power is applied which will deposit energy almost entirely in the desired combustion volume. Through control of the applied current, this technique can create an axial large variation in the propellant resistivity, which is effective at minimizing energy losses as previously described.

The runaway heating technique is clearly similar to varying the propellant formulation to create spatial variations in the electrical properties in that both techniques seek to establish an advantageously shorter resistive current path in the combustion volume. However, the runaway heating technique has several attractive advantages.

First, based on previous measurements using the ECESP formulation, resistivity can change by seven orders of magnitude with the application of current. By comparison, varying the formulation will likely only achieve 1 order of magnitude variation. Thus, runaway heating can provide 1 million times greater variation in resistance, and correspondingly greater control over the current distribution, than can varying the formulation of the ECESP. Second, the electrical control of runaway heating can be used to control propellant temperature, and thus resistivity, on a scale length of microns or better. This is much finer spatial control than can be accomplished by varying the propellant formulation. Finally, if the propellant formulation is varied, during the mission of the thruster the initial resistance of the propellant will be changing as material is expended. Such variation may increase the complexity of the control circuitry, because the magnitude of the voltage needed to drive a fixed current will have to increase. In contrast, in the runaway-heating embodiment the propellant characteristics return to their original initial condition after the propellant is extinguished.

Power Profile Shaping

The ECESP formulations rely on the combustion transmitting insufficient energy back to the solid to sustain combustion. The reaction requires augmentation of electrical energy, which once removed extinguishes combustion. However, the electrical energy does not provide all of the energy needed to sustain combustion. The ideal scenario for a fielded motor is one where the propellant is formulated to be barely subcritical and needs very little electrical energy to sustain combustion. In such an embodiment, combustion is sustained by a combination of the radiative-convective energy from the chemical combustion augmented by the applied electrical energy. In this case, the electric energy needed to ignite the discharge is significantly greater than the electric energy needed to sustain the discharge, because combustion energy abets the latter.

Figure 7A:
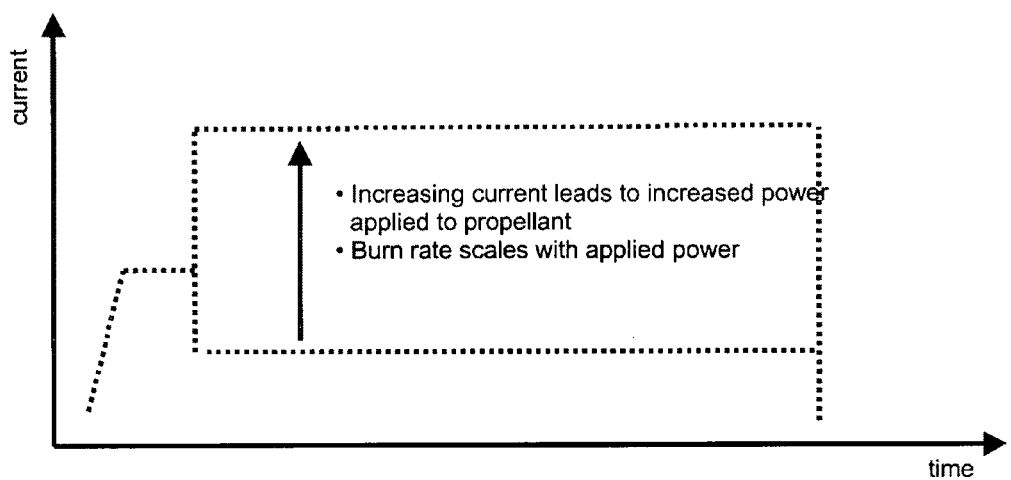
FIGS. 7a and 7b graphically show the current and voltage profiles typical for one embodiment of the invention.
Figure 7B:
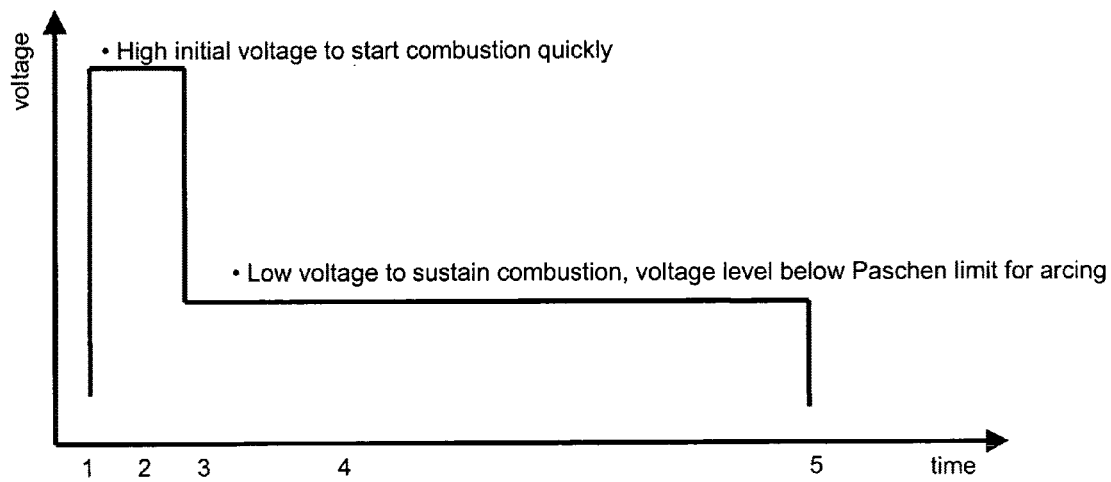

Claimed herein is the use of power profile shaping, such as that shown in FIGS. 7a and 7b, in which current (FIG. 7a) and voltage (FIG. 7b) profiles are controlled, to provide sufficient current and voltage for propellant ignition, and then a smaller sustainment current and voltage maintained until the command to extinguish is given. Initially, propellant resistance is sufficiently large to operate in a voltage control mode with a fixed applied voltage and a rising current. Upon ignition, a lower voltage may be selected to avoid arcing. As the current rises, it is common for the system resistance to drop, such that the power can be controlled in a current limited fashion.

Using the power profiling and the runaway heating methods described above, the power to the thruster can also be controlled such that the thruster will ignite at a specified start-up time.

Figure 8:
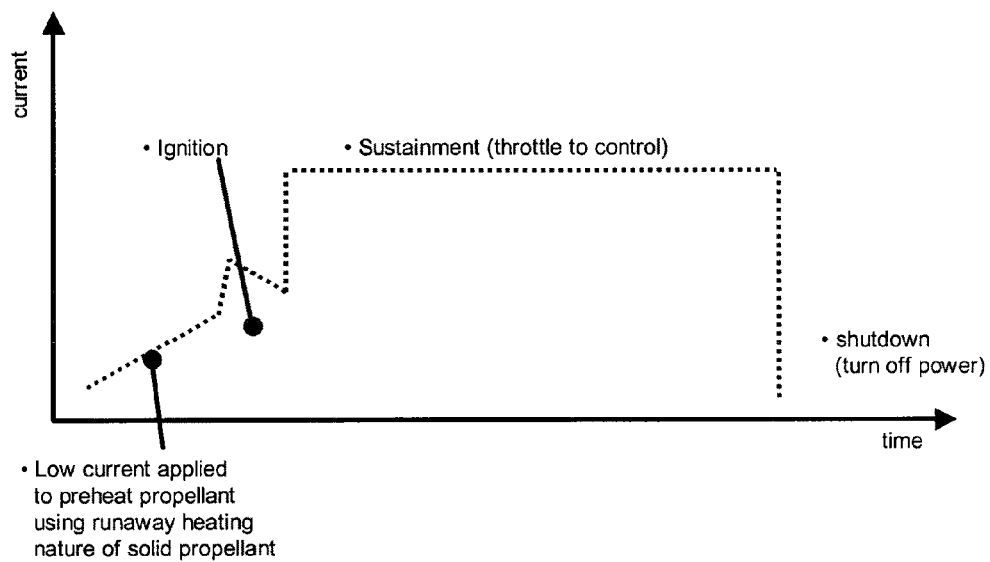
FIG. 8 graphically shows the current profile for another embodiment of the invention.

This current profile shaping method can also be used in conjunction with runaway heating to preferentially preheat the propellant in the desired combustion volume. An example of the current profile in this scenario is shown in FIG. 8, where a small current is slowly increased prior to application of the larger ignition current. This is again followed by a sustainment current until the command to extinguish.

Figure 9:
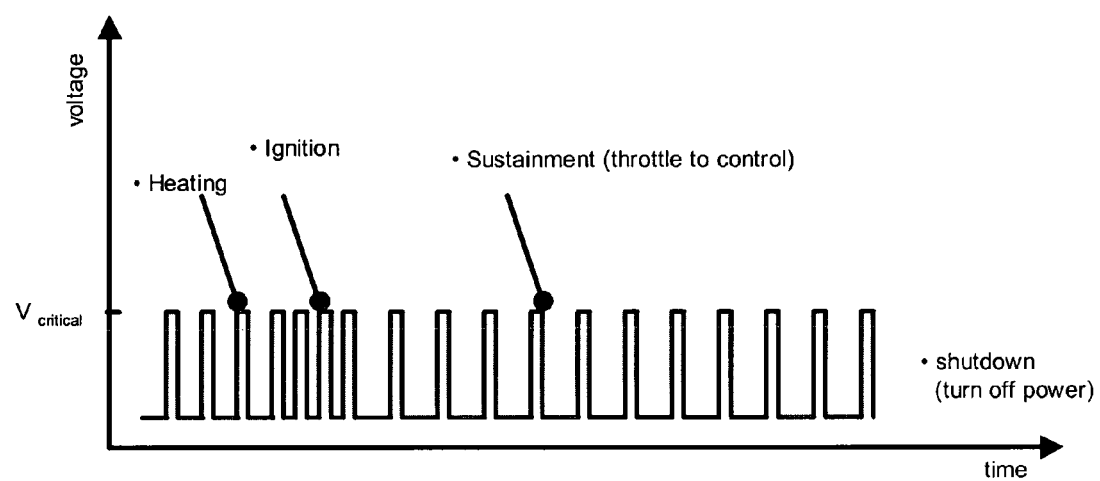
FIG. 9 graphically shows the pulse density modulation for one embodiment of the invention.

The power profile shaping disclosure has focused primarily on the case where ohmic heating is the dominant mechanism controlling combustion of the ECESPs. In the electrolysis scenario care must be given to providing an applied voltage above some critical value for combustion to occur. In this case pulse-density modulation (PDM) is disclosed as an effective means to control power input efficiently while maintaining the required critical voltage. Using PDM a series of voltage pulses is applied to the propellant. The frequency, duration, and duty cycle of the pulses is varied to vary the total power input. A PDM scenario akin to FIG. 8 is shown in FIG. 9. As shown in this exemplary embodiment, the density of the pulses is slowly increased during the runaway heating phase prior to ignition. A series of dense pulses is then applied to ignite the propellant after the resistivity in the combustion volume has decreased to the desired level. The pulse density is then decreased to sustain combustion at lower power. Finally, the pulses are ceased to extinguish the propellant.

Both current profile shaping and PDM can be used to vary the power input to the propellant during the sustainment phase. This can be used to increase or decrease the combustion rate and effectively throttle an ECESP motor.

A disclosure of electrically controlled propellant motors according to this invention is described in a previously filed provisional application entitled "Electrically Controlled Extinguishable Solid Propellant Motors", U.S. patent application No. 60/349,169, filed Jan. 16, 2002, the disclosure of which is incorporated herein by reference.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A precision control solid propellant thruster comprising:
a thruster body containing a solid propellant having an end face at which thrust is developed, said solid propellant being disposed between at least two electrodes, wherein the solid propellant ignites to produce a thrust exhaust only with the application of a specified ignition level of electrical power to the solid propellant;
a source of electrical power in electrical communication with said at least two electrodes; and
a control system to control at least one of the quantity and nature of the electrical power such that the application of the specified ignition level of electrical power is confined within a combustion region of the solid propellant near the end face such that any exothermic energy produced within the solid propellant during combustion may be utilized to expand the thrust exhaust away from the thruster.

2. The precision control solid propellant thruster as described in claim 1, wherein the at least two electrodes are cylindrical and are arranged in a coaxial geometry.

3. The precision control solid propellant thruster as described in claim 2 wherein the solid propellant has a resistivity that increases with the radial distance away from the center of the solid propellant.

4. The precision control solid propellant thruster as described in claim 3 wherein the resistivity of the solid propellant increase with increasing radius according to the equation:

$$R(r)=Cr^2$$

where R is the resistance, C is a constant and r is the radius of the solid propellant.

5. The precision control solid propellant thruster as described in claim 1, wherein the at least two electrodes are rectangular and are arranged on opposing sides of said solid propellant.

6. The precision control solid propellant thruster as described in any one of claims 1, 2 and 5, wherein the at least two electrodes provide electrical contact with the solid propellant only at the combustion region.

7. The precision control solid propellant thruster as described in claim 6, wherein the thruster body further comprises a feeder mechanism to ensure continuous contact between the electrode and the solid propellant.

8. The precision control solid propellant thruster as described in claim 7, wherein the solid propellant is moveable relative to the electrode, which is fixed and the feeder mechanism is a resilient member in contact with the solid propellant such that the solid propellant is maintained in continuous electrical communication with the electrode.

9. The precision control solid propellant thruster as described in claim 7, wherein the electrode is moveable relative to the solid propellant, which is fixed and the feeder mechanism is a resilient member in contact with the electrode such that the electrode is maintained in continuous electrical communication with the solid propellant.

10. The precision control solid propellant thruster as described in any one of claims 1, 2 and 5, wherein the at least two electrodes extend along the length of the solid propellant.

11. The precision control solid propellant thruster as described in any one of claims 1, 2 and 5, wherein at least one of the at least two electrodes is canted with respect to the other such that the distance between the two electrodes increases longitudinally inward from the end face of the solid propellant.

12. The precision control solid propellant thruster as described in claim 1, wherein the solid propellant is a electrically controlled extinguishable solid propellant.

13. The precision control solid propellant thruster as described in claim 1 wherein the solid propellant has a resistivity that increases with the longitudinal distance inward away from the end face of the solid propellant.

14. The precision control solid propellant thruster as described in claim 1, wherein the source of electrical power is a direct current source.

15. The precision control solid propellant thruster as described in claim 1, wherein the source of electrical power is an alternating current source.

16. The precision control solid propellant thruster as described in claim 15, wherein the alternating current source produces high frequency alternating current.

17. The precision control solid propellant thruster as described in claim 15, wherein the electrical power is applied to the solid propellant in a series of transient pulses.

18. The precision control solid propellant thruster as described in claim 17, wherein the transient pulses are produced by capacitive discharge.

19. The solid propellant thruster as described in claim 1, wherein the control system is designed to first apply electrical power at the specified ignition level for the solid propellant, and then to reduce the electrical power to a smaller sustainment level, which is maintained until the command to extinguish is given.

20. The precision control solid propellant thruster as described in claim 1, wherein the control system is designed to apply a preheating current to the combustion region prior to ignition to increase the temperature of the solid propellant within the combustion region, wherein the power level of the preheating current is beneath the specified ignition level for the solid propellant.

21. The precision control solid propellant thruster as described in claim 20, wherein after the application of the preheating current, the control system is designed to apply electrical power at the specified ignition level for the solid propellant, and then to reduce the electrical power to a smaller sustainment level, which is maintained until the command to extinguish is given.

22. The precision control solid propellant thruster as described in any one of claims 19 to 21, wherein the electrical power is pulsed and the power level of the electrical power is controlled by pulse density modulation.

23. The precision control solid propellant thruster as described in claim 1, wherein the at least two electrodes are arranged such that a relatively constant power per unit area is applied across the end face of the solid propellant.

* * * * *